(12) United States Patent  (10) Patent No.: US 6,709,115 B2
Chimura et al.                (45) Date of Patent:    Mar. 23, 2004

(54) PROJECTOR (75) Inventors: Kazuo Chimura, Tokyo (JP); Toshihiro Oishi, Tokyo (JP)

(73) Assignee: Mitsubishi Denki Kabushi Kaisha, Tokyo (JP)

( * ) Notice: Subject to any disclaimer, the term of this patent is extended or adjusted under 35 U.S.C. 154(b) by 0 days.

(21) Appl. No.: 10/327,861

(22) Filed: Dec. 26, 2002

(65) Prior Publication Data

US 2003/0202160 A1 Oct. 30, 2003

(30) Foreign Application Priority Data

Apr. 30, 2002 (JP) .......................... 2002-128176

(51) Int. Cl.⁷ .............................................. G03B 21/00
(52) U.S. Cl. ........................................... 353/119; 353/57
(58) Field of Search ....................... 353/119, 57, 60, 353/61

(56) References Cited

U.S. PATENT DOCUMENTS 4,925,295 A * 5/1990 Ogawa et al. ............... 353/57
5,374,969 A * 12/1994 Kyhl et al. ................. 353/119
5,820,242 A * 10/1998 Rodriguez et al. .......... 353/119
5,842,761 A * 12/1998 Futakami et al. ........... 353/119

FOREIGN PATENT DOCUMENTS

JP        09-319007 A    12/1997
JP        10-090794 A     4/1998

* cited by examiner

*Primary Examiner*—William Dowling
(74) *Attorney, Agent, or Firm*—Birch, Stewart, Kolasch & Birch, LLP (57) ABSTRACT

A projector 1 has a first casing 1A (including a first part 2 and a second part 3) and a second casing 1B (including a third part 4). The second casing 1B is moved between an enlarging position where the second casing 1B is protruded from the first casing 1A and a reducing position where the second casing 1B is retracted into the first casing 1A. As the second casing 1B moves to the enlarging position, the distance between the exhaust ports 45 and the exhaust fan 9 increases, so that the wind noise is restricted. As the second casing 1B moves to the reducing position, the exhaust ports 45 are concealed in the first casing 1A, so that the entry of the dust or the like into the projector 1 is prevented.

19 Claims, 12 Drawing Sheets

PROJECTOR

BACKGROUND OF THE INVENTION

The present invention relates to a projector which projects an image on a screen.

Recently, a projector is widely used for various applications, and it is desired to develop a compact projector having superior portability. Generally, in order to control the rise in the temperature of the projector due for example to a light source, the heated air in the projector must be exhausted by means of an exhaust fan. In many projectors, the exhaust fan and an exhaust port are closely placed, because of the demand for reducing the size of the projector.

Figure 16A:
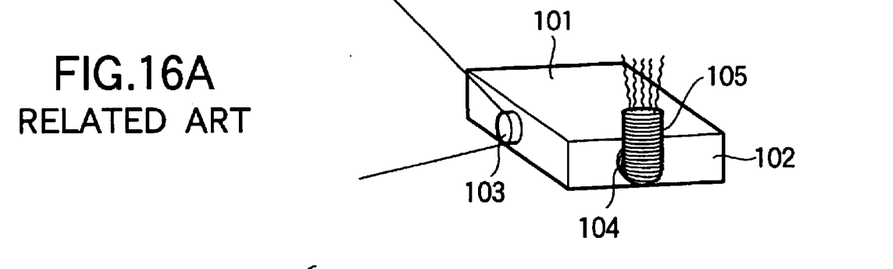
FIGS. 16A and 16B are a perspective view and a side view showing an outer shape of a conventional projector.
Figure 16B:
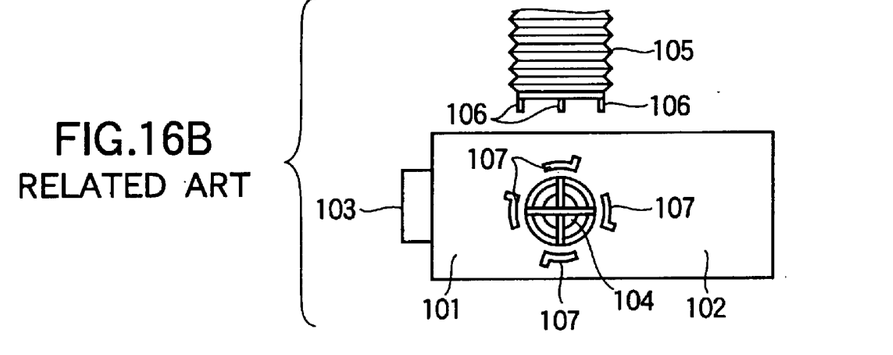

There is also type of projector having an externally attached duct for preventing the exhausted air from blowing toward a person beside the projector. FIGS. 16A and 16B are respectively a perspective view and a side view showing an outer shape of a projector disclosed in a Japanese Laid-Open Patent Publication HEI 9-319007. As shown in FIG. 16A, a projector 101 has a projection lens 103 provided on the front of an enclosure 102 and an exhaust port 104 provided on the side of the enclosure 102. A duct 105 is detachably attached to the exhaust port 104. The duct 105 directs the exhausted air upward, so that the exhausted air does not blow toward the person beside the projector.

As shown in FIG. 16B, the duct 105 is attached to the enclosure 102, by inserting engagement pieces 106 formed at the end of the duct 105 into grooves 107 formed around the exhaust port 104, and by rotating the duct 105 in one direction. The duct 105 is detached from the enclosure 102, by rotating the duct 105 in a reverse direction, and by removing the engagement pieces 106 from the grooves 107.

Figure 17A:
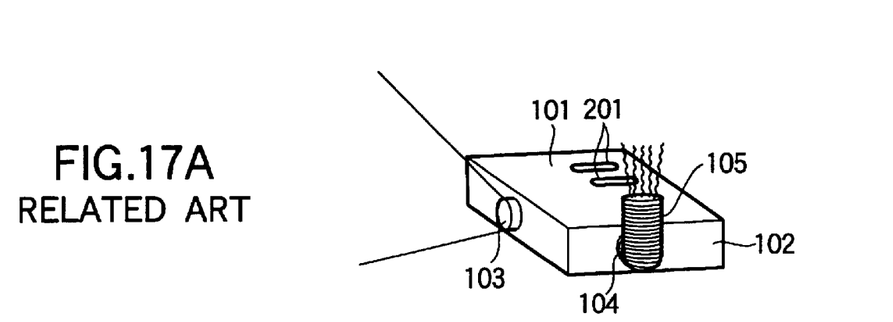
FIGS. 17A and 17B are a perspective view and a side view showing an outer shape of another conventional projector.
Figure 17B:
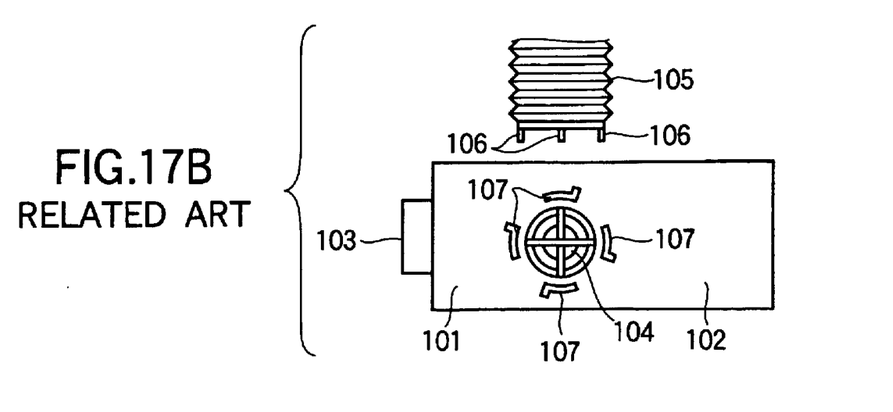

FIGS. 17A and 17B are respectively a perspective view and a side view showing an outer shape of another conventional projector. In addition to the components described with reference to FIGS. 16A and 16B, inlet ports 201 are formed on the top of the enclosure 102. The outside air is taken through the inlet ports 201 and the inside air is exhausted through the exhaust port 104. Thus, the cooling effect is enhanced.

However, the above described conventional projectors have the following problems.

First, the projector in which the exhaust fan and the exhaust port are closely placed has a problem that a noise called "wind noise" is generated. In order to restrict the wind noise being generated, it is necessary to provide a large space between the exhaust fan and the exhaust port. However, if such a space is provided, it becomes difficult to reduce the size of the projector.

Additionally, in order to keep the exhaust fan operating properly, it is necessary to keep the temperature of a fan motor built in the exhaust fan within a suitable temperature range. Thus, generally, a reflector or the like is provided between a lamp used as a light source and the exhaust fan, to shield the exhaust fan from the radiation from the lamp. In order to reduce the number of components of the projector, it is preferable to eliminate such a reflector. However, to eliminate the reflector, the distance between the lamp and the exhaust fan must be increased, and therefore it becomes difficult to reduce the size of the projector.

Further, the projector 101 having the externally attached duct 105 as shown in FIGS. 16A through 17B is not convenient to use, since the duct 105 needs to be attached to the projector and the direction of the duct 105 needs to be adjusted each time the projector 101 is used. Moreover, this projector 101 has another problem that the attached duct 105 impairs the appearance of the projector 101.

In addition, the projector having the inlet ports as shown in FIGS. 17A and 17B has a problem that the dust or the like enters into the projector through the inlet ports when the projector is not used, and degrades the displayed image.

SUMMARY OF THE INVENTION

This invention is intended to solve the above described problems, and an object of the present invention is to provide a compact projector having excellent portability, to restrict the noise generated in the projector, and to reduce the number of components of the projector.

A projector according to the invention comprises an image projection unit which projects an image and has a light source. The projector further comprises a first casing in which the image projection unit is mounted, and a second casing combined with the first casing thereby to constitute an enclosure enclosing the image projection unit. The second casing is movable relative to the first casing, between an enlarging position where the volume of the enclosure is enlarged and a reducing position where the volume of the enclosure is reduced. The projector further comprises an exhaust port formed on the second casing.

According to one aspect of the invention, the projector further comprises an exhaust fan mounted to the first casing. The exhaust fan is made to rotate when the light source illuminates.

When the projector is not used, the size of the projector can be reduced by moving the second casing to the reducing position. Thus, the portability of the projector is enhanced. Further, when the projector is used, the second casing can be moved to the enlarging position to restrict the noise. Thus, the quietness of the projector is enhanced.

According to another aspect of the invention, the projector further comprises an exhaust fan mounted to the second casing. The distance between the exhaust fan and the light source is longer when the second casing is in the enlarging position than when the second casing is in the reducing position.

When the projector is not used, the size of the projector can be reduced by moving the second casing to the reducing position. Thus, the portability of the projector is enhanced. Further, when the projector is used, the temperature of the exhaust fan can be kept in a suitable range without using a reflector or the like, by moving the second casing to the enlarging position so that the distance between the exhaust fan and the light source increases. Thus, the reflector is eliminated and therefore the number of the components of the projector is reduced.

DETAILED DESCRIPTION OF THE INVENTION

Embodiments of the invention will be described with reference to the attached drawings.
Embodiment 1.

Figure 1:
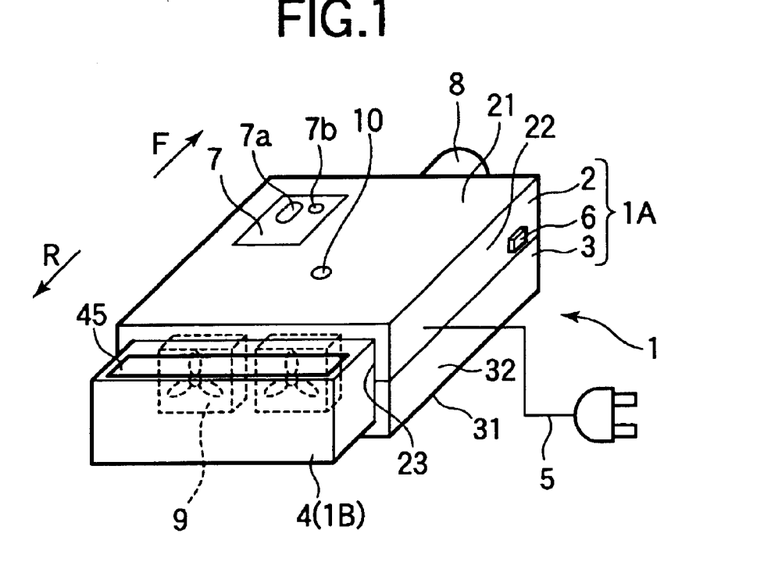
FIG. 1 is a perspective view showing an outer shape of the projector according to Embodiment 1 in the operating condition.
Figure 2:
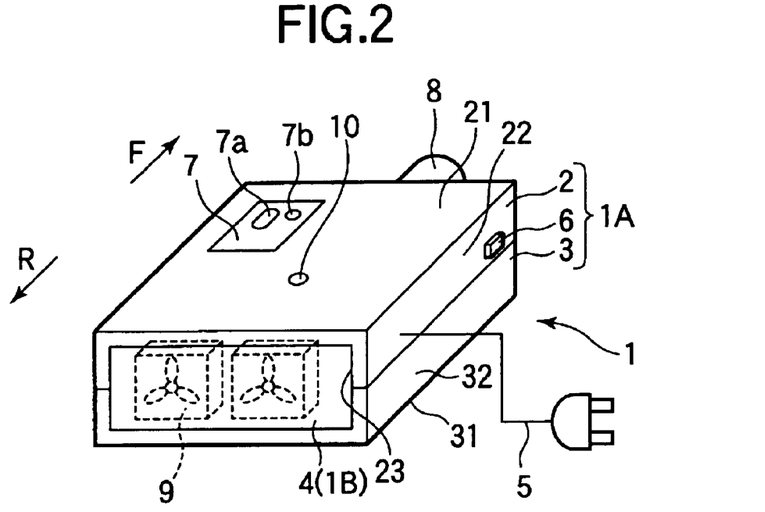
FIG. 2 is a perspective view showing an outer shape of the projector according to Embodiment 1 in the non-operating condition.

FIGS. 1 and 2 are perspective views showing an outer shape of a projector 1 according to Embodiment 1. FIG. 1 corresponds to the operating condition, that is, the condition in which the projector 1 is used. FIG. 2 corresponds to the non-operating condition, that is, the condition in which the projector 1 is not used. As shown in FIG. 1, the projector 1 includes a power supply cable 5, a power switch 6, a control panel 7 and a projection lens 8. The power supply cable 5 is connected to a not shown receptacle for supplying the power to the projector 1. The power switch 6 is operated to turn on and off the projector 1. The control panel 7 is provided with an ON-OFF button 7a and an indicator 7b. The ON-OFF button 7a is operated to start projecting an image. The indicator 7b indicates that the projector 1 is projecting the image. The projection lens 8 projects the image on a not shown screen.

In the description below, the projection lens 8 side of the projector 1 (shown by an arrow F in FIG. 1) is described as "front." The side opposite to the front side of the projector 1 (shown by an arrow R in FIG. 1) is described as "rear." The term "top" is used to mean the top plate 21 side of the projector 1. The term "bottom" is used to mean the bottom plate 31 side of the projector 1.

In FIG. 1, an enclosure that encloses the components of the projector 1 includes a first part 2, a second part 3 and a third part 4. The first part 2 has a rectangular top plate 21, and a wall portion 22 extending downward from the front edge and the side edges of the top plate 21. The second part 3 has a rectangular bottom plate 31, and a wall portion 32 extending upward from the front edge and the side edges of the bottom plate 31. The first part 2 and the second part 3 are fixed to each other in such a manner that the top plate 21 and the bottom plate 31 face each other. The projection lens 8 is mounted to the wall portions 22 and 32 of the first part 2 and the second part 3. The first part 2 and the second part 3 constitute a first casing 1A.

The third part 4 is slidably mounted in an opening 23 formed on the rear side of the first part 2 and the second part 3. When the projector 1 is in the operating condition, the third part 4 is drawn to a position where the third part 4 is protruded from the first part 2 and the second part 3 as shown in FIG. 1. When the projector 1 is in the non-operating condition, the third part 4 is pushed (retracted) into the first part 2 and the second part 3 as shown in FIG. 2. That is, the third part 4 constitutes a second casing 1B movable with respect to the first casing 1A constituted by the first part 2 and the second part 3. When the third part 4 is in its protruded position, the volume of the enclosure of the projector 1 is enlarged. When the third part 4 is in its retracted position, the volume of the enclosure of the projector 1 is reduced. In the description below, the position of the third part 4 protruded from the first part 2 and the second part 3 is referred to as an "enlarging position." The position of the third part 4 retracted in the first part 2 and the second part 3 is referred to as a "reducing position."

Figure 3A:
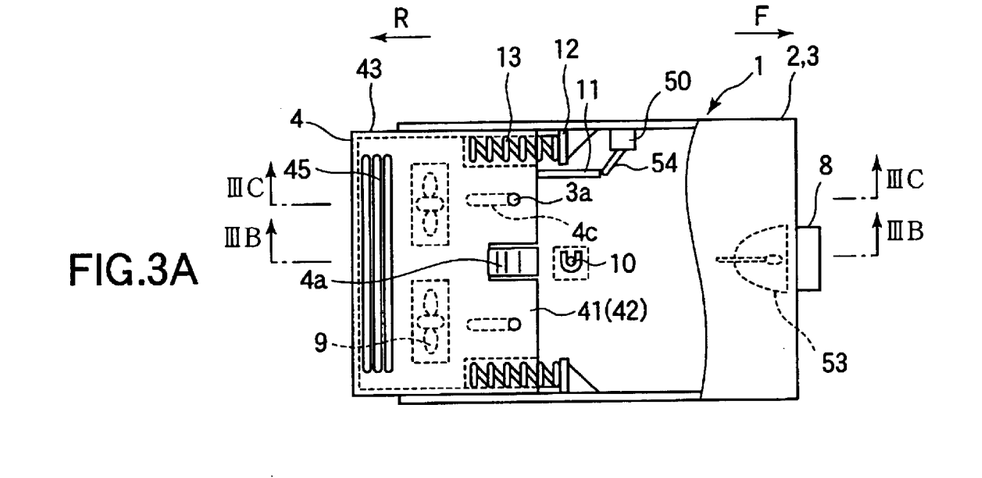
FIG. 3A is a sectional view showing an internal structure of the projector according to Embodiment 1 in the operating condition.
Figure 3B:
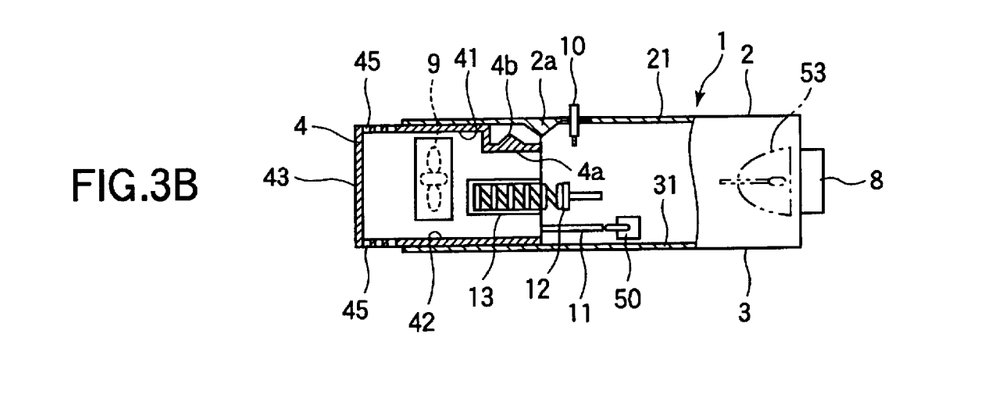
FIGS. 3B and 3C are cross sectional views respectively taken along line IIIB—IIIB and line IIIC—IIIC in FIG. 3A.
Figure 3C:
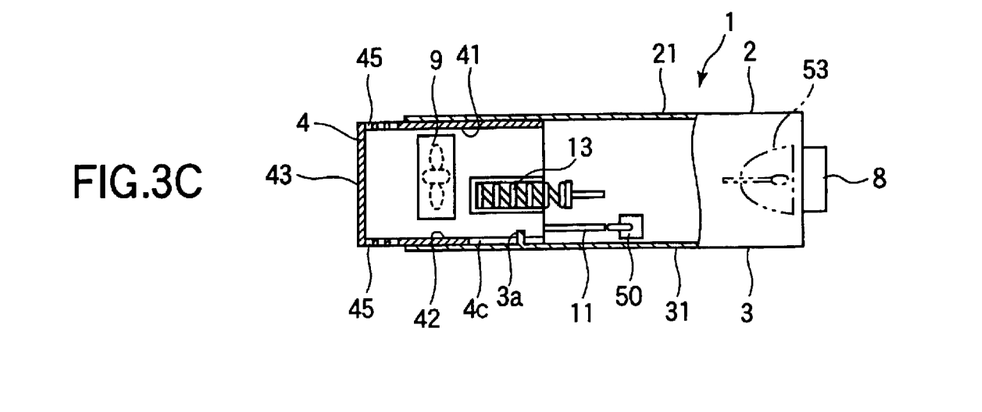
Figure 4A:
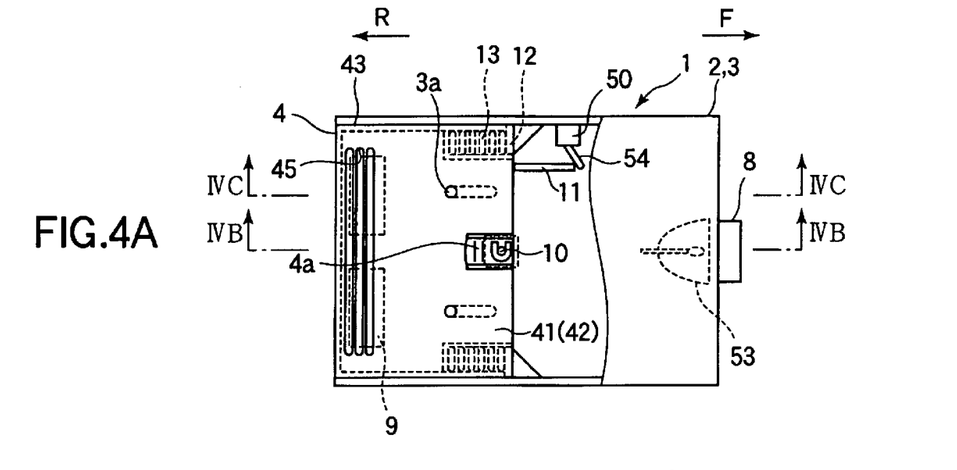
FIG. 4A is a sectional view showing an internal structure of the projector according to Embodiment 1 in the non-operating condition.
Figure 4B:
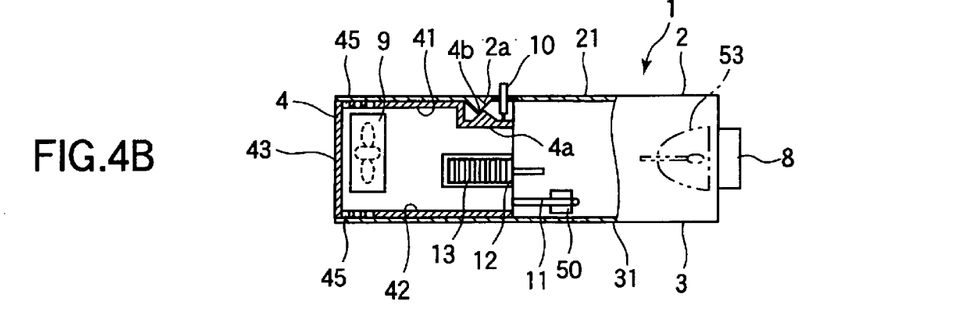
FIGS. 4B and 4C are cross sectional views respectively taken along line IVB—IVB and line IVC—IVC in FIG. 4A.
Figure 4C:
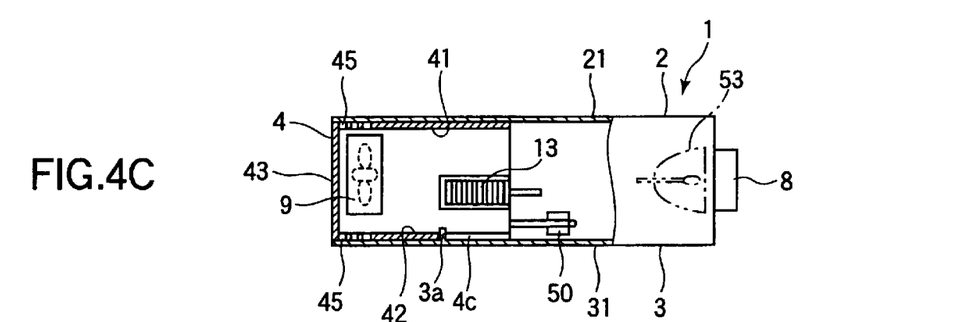

FIG. 3A is a sectional view showing an internal structure of the projector 1 in the operating condition. FIGS. 3B and 3C are cross sectional views respectively taken along line IIIB—IIIB and line IIIC—IIIC in FIG. 3A. FIG. 4A is a sectional view showing an internal structure of the projector 1 in the non-operating condition. FIGS. 4B and 4C are cross sectional views taken along line IVB—IVB and line IVC—IVC in FIG. 4A.

As will be seen from in FIGS. 3A through 3C and FIGS. 4A through 4C, the third part 4 includes a top plate 41, a bottom plate 42 and a wall portion 43 formed between the top plate 41 and the bottom plate 42. The top plate 41 and the bottom plate 42 face each other. The top plate 41 and the bottom plate 42 are positioned between the top plate 21 and the bottom plate 31 of the first part 2 and the second part 3. The wall portion 43 extends along the left side, the right side and the rear side of a space between the top plate 41 and the bottom plate 42.

A light source in the form of a lamp 53 is provided to emit light for projecting the image through the projection lens 8.

Exhaust ports 45 are formed in the vicinities of the rear ends of the top plate 41 and the bottom plate 42. The exhaust ports 45 are exposed from the first part 2 and the second part 3, when the third part 4 is in the enlarging position. Conversely, the exhaust ports 45 are concealed in the first part 2 and the second part 3, when the third part 4 is in the retracted position. Since the exhaust ports 45 are formed on the top plate 41 and the bottom plate 42, the exhausted air is directed upward and downward.

An exhaust fan 9 is positioned in the third part 4. However, the exhaust fan 9 is not fixed to the third part 4, but is fixed to the first part 2 and the second part 3 by means of a not shown member. As a result, when the third part 4 is in the retracted position, the exhaust ports 45 are positioned in the vicinity of the exhaust fan 9, as shown in FIGS. 4A through 4C, while when the third part 4 is in the enlarging position, the exhaust ports 45 are positioned apart from the exhaust fan 9, as shown in FIGS. 3A through 3C.

Slide guide grooves 4c are formed on the bottom plate 42 of the third part 4, and are located on the right and left parts of the bottom plate 42. The slide guide grooves 4c extend in the front-rear direction. The slide guide grooves 4c slidably engage slide guide pins 3a protruded from the bottom plate 31 of the second part 3. By the slidable engagement of the slide guide grooves 4c with the slide guide pins 3a, the third part 4 is guided to move frontward and rearward with respect to the first part 2 and the second part 3.

Spring members 13 have rear ends fixed to fixing members (not shown) provided on the wall portion 43 of the third part 4. The front ends of the spring members 13 are in contact with contact plates 12 provided on the second part 3. The spring members 13 push the third part 4 rearward, that is, in the direction in which the third part 4 is protruded from the first part 2 and the second part 3.

As is best seen in FIG. 3B, a first lock member (a claw) 2a, a second lock member 4a and an accommodation release button 10 are additionally provided. The second lock member 4a is elongated in the front-rear direction. The second lock member 4a has a rear end unitarily formed with the top plate 41, so that the front end of the second lock member 4a is able to deform and bend toward the bottom plate 42. The second lock member 4a has an engaging protrusion 4b having a triangular cross section protruded upward (that is, toward the top plate 21 of the first part 2). The first lock member 2a is a protrusion having a triangular cross section protruded downward from the top plate 21 of the first part 2.

When the third part 4 moves toward the reducing position, the engaging protrusion 4b of the second lock member 4a abuts against the first lock member 2a, causing the second lock member 4a to bend downward. As shown in FIG. 4B, when the third part 4 reaches the reducing position, the second lock member 4a returns to its original position, and engages the first lock member 2a. Thus, the third part 4 is locked in the reducing position. The accommodation release button 10 is provided on the top plate 21 of the first part 2. The accommodation release button 10 is movable upward and downward, so that the accommodation release button 10 is able to press the second lock member 4a downward, that is, toward the bottom plate 31. The upper end of the accommodation release button 10 is protruded upward from the top plate 21 of the first part 2, so that a user is able to press the accommodation release button 10. When the user presses the accommodation release button 10, the second lock member 4a bends downward and is disengaged from the first lock member 2a. Thus, the third part 4 moves to the enlarging position, by the force of the spring members 13.

An arm 11 and a switch 50 are used to detect whether the third part 4 is in the enlarging position or in the reducing position. The arm 11 extends frontward from the front end of the third part 4. The arm 11 moves frontward and rearward together with the movement of the third part 4. The switch 50 has a swing lever 54 against which the arm 11 abuts. As shown in FIG. 4A, when the third part 4 is in the reducing position, the arm 11 pushes the swing lever 54 so that the swing lever 54 is swung to the front side. As shown in FIG. 3A, when the third part 4 is in the enlarging position, the arm 11 does not push the swing lever 54, so that the swing lever 54 is swung to the rear side by the force of a spring (not shown). The switch 50 outputs a signal corresponding to the position of the swing lever 54.

Figure 5:
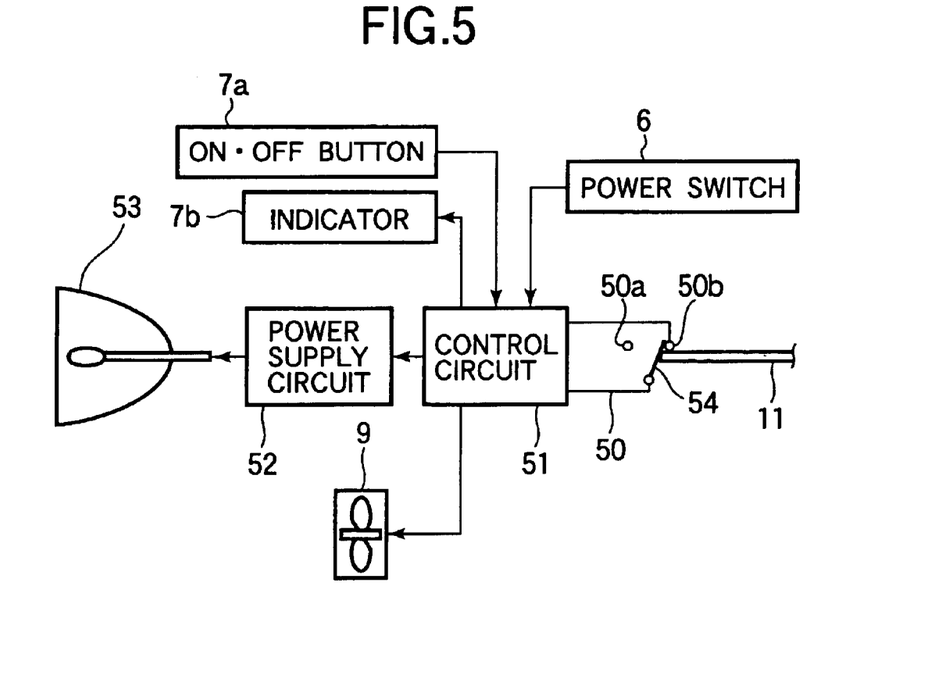
FIG. 5 is a block diagram showing a control system of the projector according to Embodiment 1.

FIG. 5 is a block diagram showing a control system of the projector 1. The control system includes a control circuit 51 and a power supply circuit 52. The power supply circuit 52 supplies the power to the lamp 53. The control circuit 51 controls the power supply circuit 52. The control circuit 51 permits and prohibits the supply of the power from the power supply circuit 52 to the lamp 53, according to the switch 50. The switch 50 has two contacts 50a and 50b selected by the swing lever 54. When the contact 50b of the switch 50 is selected, the control circuit 51 permits the power supply circuit 52 to supply the power to the lamp 53. Conversely, when the contact 50a of the switch 50 is selected, the control circuit 51 prohibits the supply of the power from the power supply circuit 52 to the lamp 53. When the switch 50 is not pushed by the arm 11, the swing lever 54 returns to the contact 50b side (by the above described spring), and therefore the contact 50b of the switch 50 is selected.

The control circuit 51 is connected to the power switch 6, the ON-OFF button 7a and the indicator 7b. When the ON-OFF button 7a is pressed while the contact 50b of the switch 50 is selected, the control circuit 51 permits the power supply circuit 52 to supply the power to the lamp 53, thereby to turn on the lamp 53.

When the projector 1 is not used, the projector 1 may be stored in such a manner that the third part 4 is in the reducing position (that is, the third part 4 is retracted in the first part 2 and the second part 3).

When the user uses the projector 1, the user connects the power supply cable 5 to the receptacle, and presses the power switch 6. Thus, the projector 1 is turned on, and the power is supplied to the control circuit 51. Then, the user presses the accommodation release button 10. Thus, the first lock members 2a are disengaged from the second lock members 4a, so that the third part 4 moves to the enlarging position by the force of the spring members 13. The position of the exhaust fan 9 does not change, while the exhaust ports 45 are protruded from the first part 2 and the second part 3. As a result, the distance between the exhaust ports 45 and the exhaust fan 9 increases. Together with the movement of the third part 4 to the enlarging position, the arm 11 provided on the third part 4 moves in the direction away from the switch 50, and therefore the switch 50 is switched to the contact 50b. Thus, the control circuit 50 permits the power supply circuit 52 to supply the power to the lamp 53. This brings the projector 1 in a stand-by mode, that is, a mode in which the lamp 53 is to be turned on when the ON-OFF button 7a is pressed. When the user presses the ON-OFF button 7a in this stand-by mode, the lamp 53 turns on and the projection of the image is started. At the same time, the indicator 7b turns on, and the exhaust fan 9 starts blowing the air. Since the exhaust fan 9 is positioned apart from the exhaust ports 45, the wind noise is restricted.

Alternatively, the projector 1 can be arranged to start projecting the image by pressing the power switch 9, pressing the ON-OFF button 7a, and pressing the accommodation release button 10, in this order. In this case, the control circuit 51 permits the power supply circuit 52 to supply the power to the lamp 53, when the third part 4 moves to the enlarging position (that is, when the switch 50 is switched to the contact 50b) after the ON-OFF button 7a is pressed.

While the image is projected by the illumination of the lamp 53, the air is blown by the exhaust fan 9 and is exhausted through the exhaust ports 45 on the top and bottom of the third part 4. As a result, the temperature in the projector 1 is kept substantially constant. The exhausted air is directed upward and downward, and therefore the exhausted air does not blow toward a person beside the projector 1. Further, the exhaust ports 45 are provided on the top and the bottom of the projector 1, with the result that the leakage of the light from the lamp 53 through the exhaust ports 45 can be prevented. Such a leakage is easy to occur if the exhaust ports are provided on the side of the projector.

After the projection of the image is completed, the user presses the ON-OFF button 7a to turn off the lamp 53, and pushes the third part 4 into the first part 2 and the second part 3. The third part 4 moves toward the reducing position, overcoming the force of the spring members 13. The third part 4 is guided to the reducing position, by the slidable engagement between the slide guide grooves 4c and the slide guide pins 3a. As the third part 4 reaches the reducing position, the second lock member 4a engages the first lock member 2a, so that the third part 4 is locked in the reducing position. As the exhaust ports 45 are concealed in the first part 2 and the second part 3, the entry of dust or the like through the exhaust ports 45 is prevented. Further, as the switch 50 is switched to the contact 50a by the movement of the arm 11 provided on the third part 4, the supply of the power from the power supply circuit 52 to the lamp 53 is prohibited. Thus, if the user mistakenly pushes the third part 4 into the first part 2 and the second part 3, without having pressed the ON-OFF button 7a (that is, without turning off the lamp 53), the lamp 53 automatically turns off. Further, if the user mistakenly presses the ON-OFF button 7a when the third part 4 is in the reducing position, the lamp 53 is not turned on.

As described above, according to Embodiment 1, the third part 4 is moved to the enlarging position in the operating condition, while the third part 4 is moved to the reducing position in the non-operating condition. As a result, the size of the projector 1 can be reduced when the projector 1 is carried. Therefore, the portability of the projector 1 is enhanced.

Additionally, the distance between the exhaust ports 45 and the exhaust fan 9 increases in the operating condition, and therefore the wind noise is restricted. Thus, the quietness is enhanced.

Further, the exhaust ports 45 are provided on the top and bottom of the third part 4, so that the exhaust air does not blow toward the person beside the projector 1. In addition, there is no need for a complicated attachment operation of an external duct, with a result that the projector becomes more convenient to use. Besides, since such an external duct is not attached to the projector, the appearance of the projector 1 is not impaired.

Furthermore, the exhaust ports 45 are concealed in the first part 2 and the second part 3 in the non-operating condition, so that the entry of the dust or the like through the exhaust ports 45 is prevented.

Moreover, the switch 50 detects whether the third part 4 is in the enlarging position or in the reducing position, and the projector 1 does not project the image when the third part 4 is in the reducing position. As a result, the erroneous operation can be prevented.

In addition, the exhaust ports 45 are provided on the top and the bottom of the projector 1, and therefore the leakage of the light from the lamp 53 through the exhaust ports 45 can be prevented.

Embodiment 2.

Figure 6:
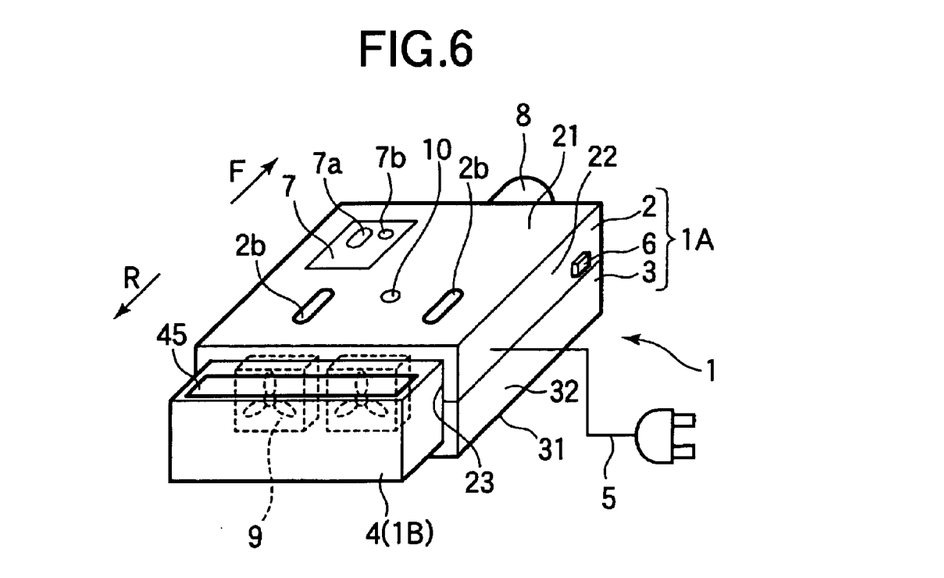
FIG. 6 is a perspective view showing an outer shape of the projector according to Embodiment 2 in the operating condition.
Figure 7:
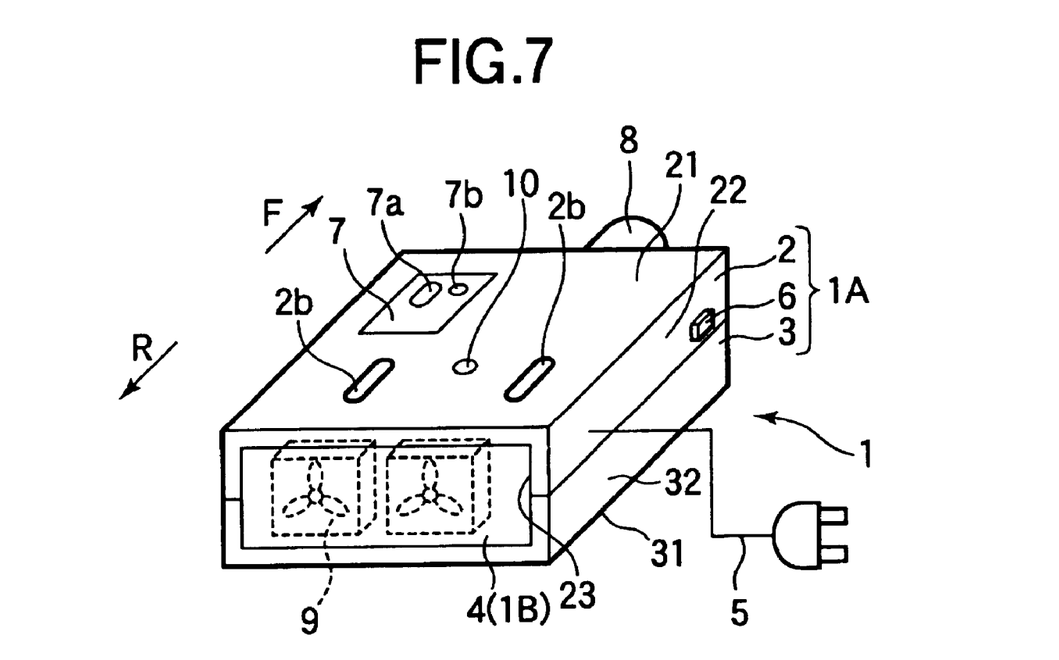
FIG. 7 is a perspective view showing an outer shape of the projector according to Embodiment 2 in the non-operating condition.
Figure 8A:
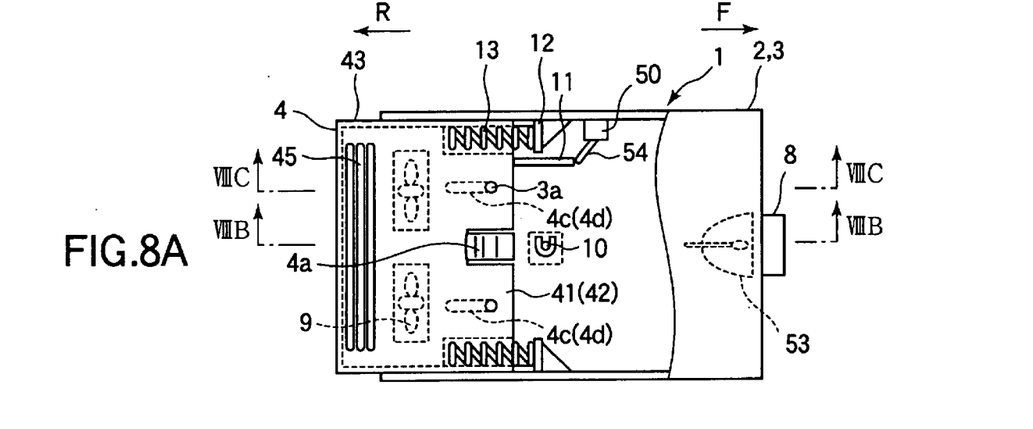
FIG. 8A is a sectional view showing an internal structure of the projector according to Embodiment 2 in the operating condition.
Figure 8B:
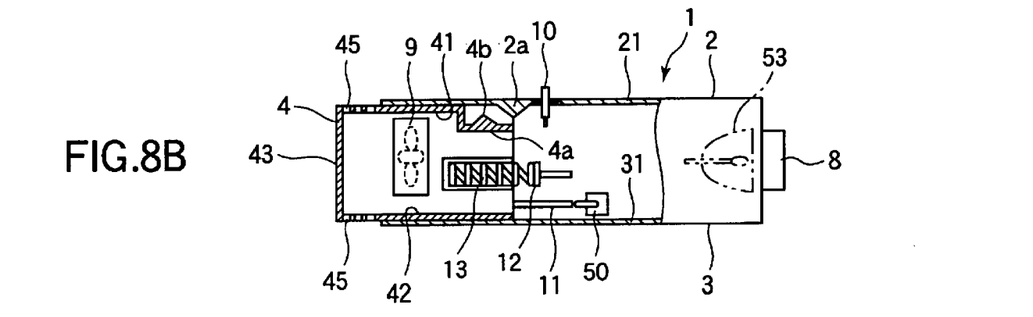
FIGS. 8B and 8C are cross sectional views respectively taken along line VIIIB—VIIIB and line VIIIC—VIIIC in FIG. 8A.
Figure 8C:
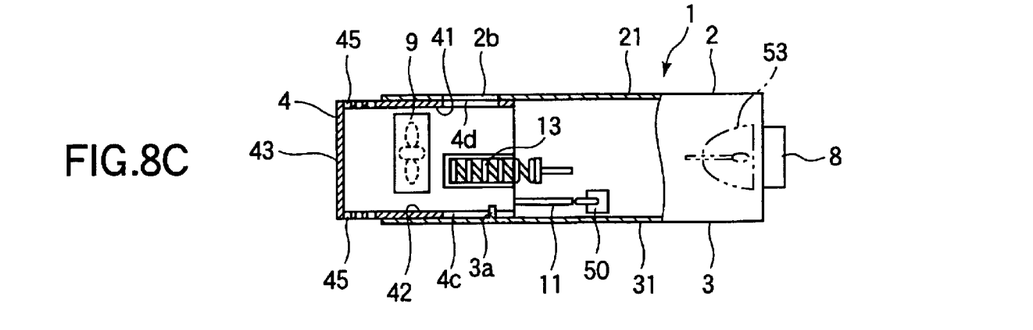
Figure 9A:
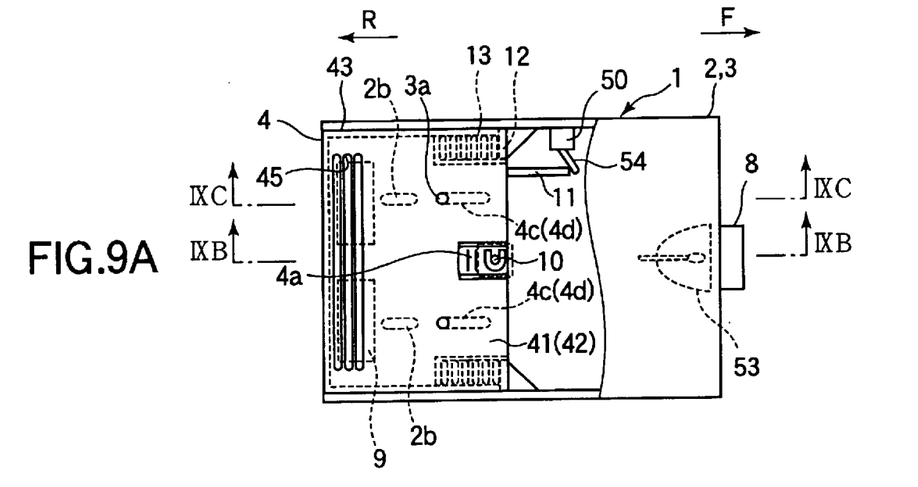
FIG. 9A is a sectional view showing an internal structure of the projector according to Embodiment 2 in the non-operating condition.
Figure 9B:
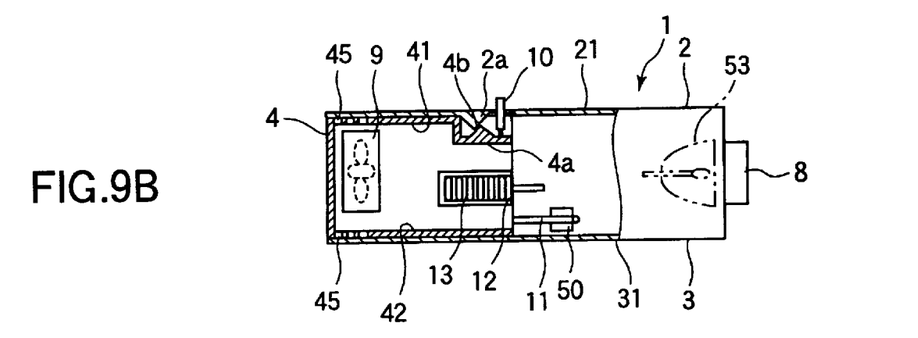
FIGS. 9B and 9C are cross sectional views respectively taken along line IXB—IXB and line IXC—IXC in FIG. 9A.
Figure 9C:
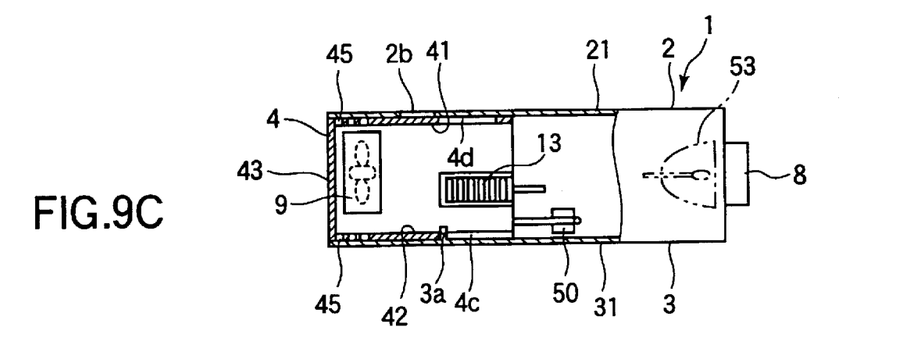

FIGS. 6 and 7 are perspective views showing an outer shape of a projector 1 according to Embodiment 2, respectively corresponding to the operating condition and the non-operating condition. FIG. 8A is a sectional view showing an internal structure of the projector 1 according to Embodiment 2 in the operating condition. FIGS. 8B and 8C are cross sectional views respectively taken along line VIIIB—VIIIB and line VIIIC—VIIIC in FIG. 8A. FIG. 9A is a sectional view showing an internal structure of the projector 1 according to Embodiment 2 in the non-operating condition. FIGS. 9B and 9C are cross sectional views respectively taken along line IXB—IXB and line IXC—IXC in FIG. 9A.

The projector 1 according to Embodiment 2 has inlet ports 2b formed on the top plate 21 of the first part 2, and openings 4d formed on the top plate 41 of the third part 4. As shown in FIG. 8C, when the third part 4 is in the enlarging position, the inlet ports 2b overlap with the openings 4d, allowing the air to flow through the inlet ports 2b. As shown in FIG. 9C, when the third part 4 is in the reducing position, the inlet ports 2b are displaced from the opening 4d (that is, the inlet ports 2b are closed), preventing the air from flowing through the inlet ports 2b. The components of the projector 1 other than the inlet ports 2b and the openings 4d are the same as those of the projector 1 of Embodiment 1, and the description thereof is omitted.

As in Embodiment 1, when the user uses the projector 1, the user connects the power supply cable 5 to the receptacle. Further, the user presses the power switch 6, and then presses the accommodation release button 10 so that the third part 4 moves to the enlarging position. Thus, the exhaust ports 45 provided on the third part 4 move out of the first part 2 and the second part 3, and the inlet ports 2b overlap with the openings 4d. As the third part 4 moves to the enlarging position, the distance between the exhaust ports 45 and the exhaust fan 9 increases, as in Embodiment 1. Further, as the switch 50 is switched according to the movement of the third part 4, the power supply circuit 52 is ready to supply the power to the lamp 53. In this condition, when the user presses the ON-OFF button 7a, the lamp 53 turns on and the projection of the image is started. Further, the power indicator 7b is turned on, and the exhaust fan 9 starts blowing the air. The air in the projector 1 is exhausted through the exhaust ports 45, while the outside air flows in the projector 1 through the inlet ports 2b. By taking the outside air through the inlet ports 2b, the cooling effect of the projector 1 is enhanced.

After the projection of the image is completed, the user presses the ON-OFF button 7a to turn off the lamp 53, and pushes the third part 4 into the first part 2 and the second part 3. As described in Embodiment 1, the third part 4 is guided to the reducing position, by the slidable engagement between the slide guide grooves 4c and the slide guide pins 3a. Since the switch 50 is switched by the movement of the arm 11 provided on the third part 4, the supply of the power from the power supply circuit 52 to the lamp 53 is prohibited. As the third part 4 moves to the reducing position, the inlet ports 2b are displaced from the openings 4d, and the air is therefore prevented from flowing through the inlet ports 2b.

Further, as was also described in Embodiment 1, the exhaust ports 45 are concealed in the first part 2 and the second part 3, and therefore the entry of the dust or the like through the exhaust ports 45 is prevented. Moreover, the inlet ports 2b are closed in the non-operating condition, and therefore the entry of the dust or the like through the inlet ports 2b is prevented.

As described above, according to Embodiment 2, the inlet ports 2b are opened in the operating condition and are closed in the non-operating condition. As a result, the cooling effect is further enhanced, and the entry of the dust or the like into the projector 1 is prevented, in addition to the advantages described in connection with Embodiment 1.

Embodiment 3.

Figure 10:
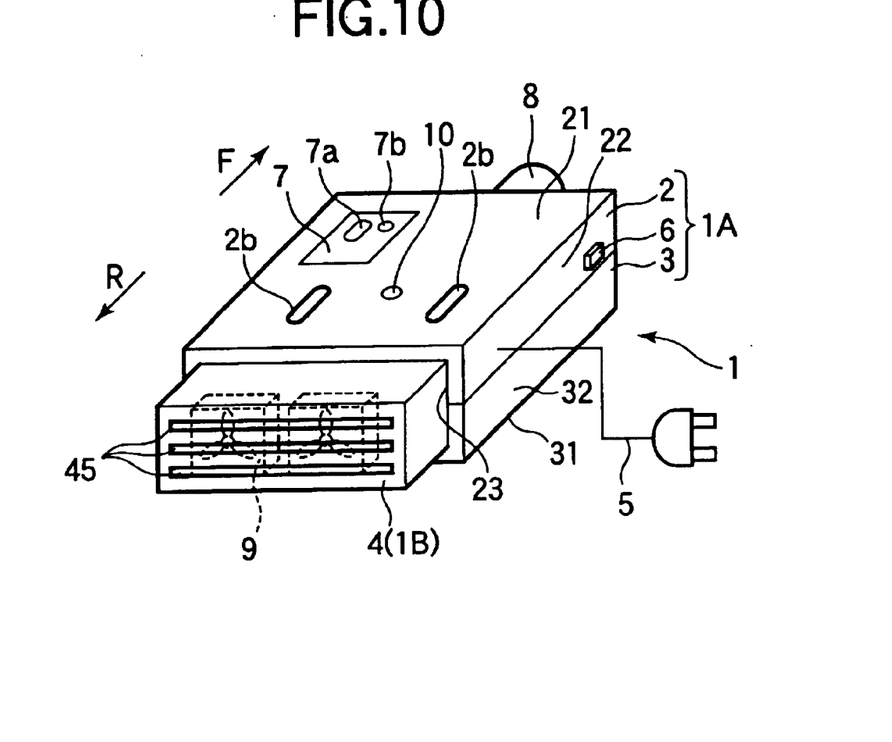
FIG. 10 is a perspective view showing an outer shape of the projector according to Embodiment 3 in the operating condition.
Figure 11:
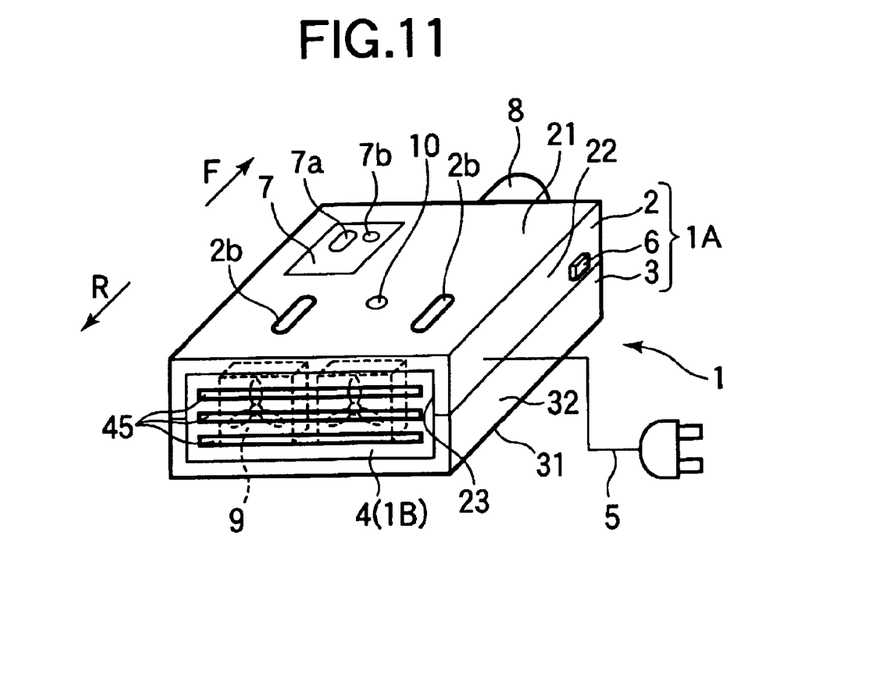
FIG. 11 is a perspective view showing an outer shape of the projector according to Embodiment 3 in the non-operating condition.
Figure 12A:
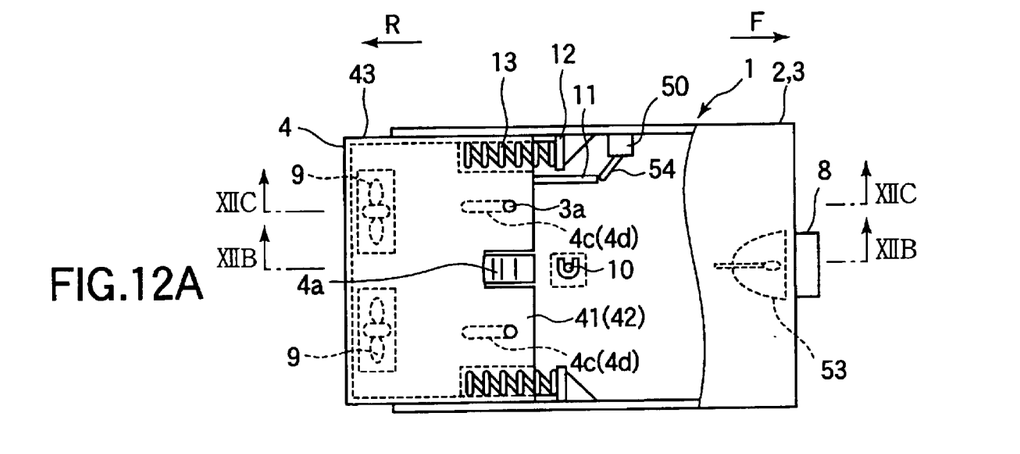
FIG. 12A is a sectional view showing an internal structure of the projector according to Embodiment 3 in the operating condition.
Figure 12B:
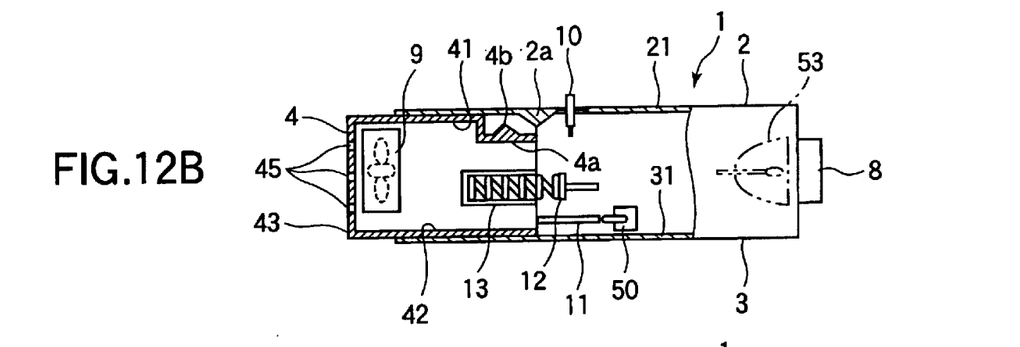
FIGS. 12B and 12C are cross sectional views respectively taken along line XIIB—XIIB and line XIIC—XIIC in FIG. 12A.
Figure 12C:
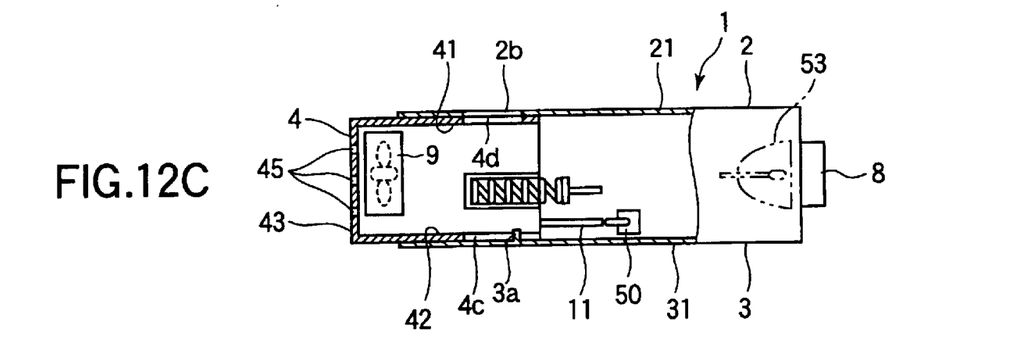
Figure 13A:
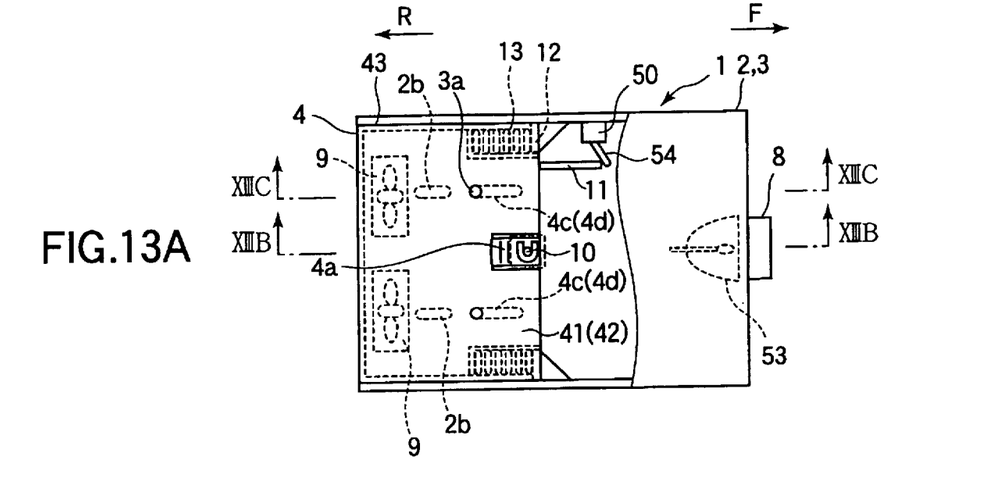
FIG. 13A is a sectional view showing an internal structure of the projector according to Embodiment 3 in the non-operating condition.
Figure 13B:
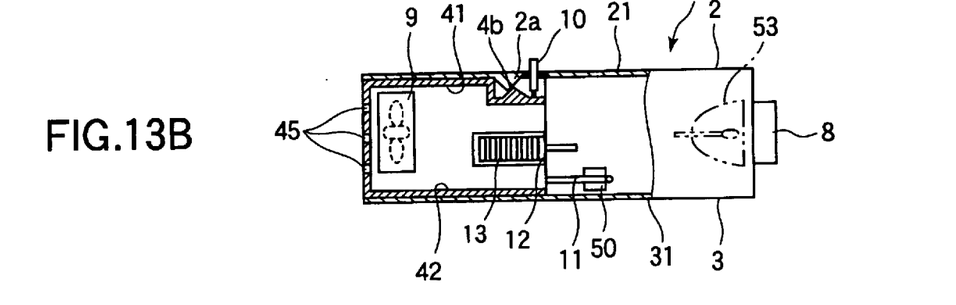
FIGS. 13B and 13C are cross sectional views respectively taken along line XIIIB—XIIIB and line XIIIC—XIIIC in FIG. 13A.
Figure 13C:
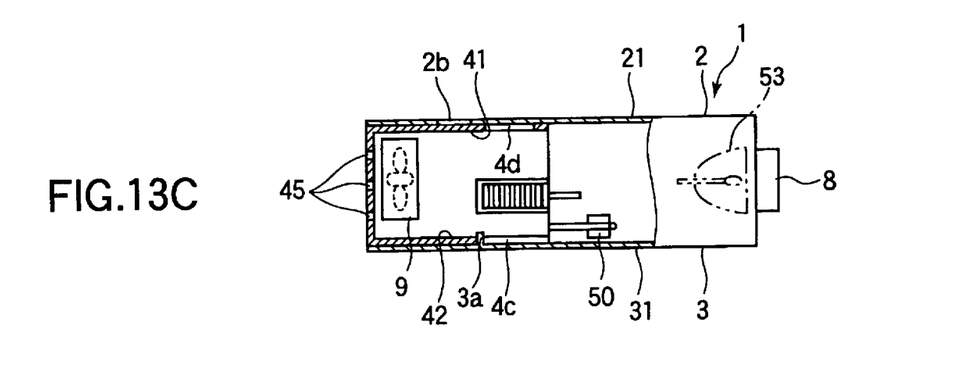

FIGS. 10 and 11 are perspective views showing an outer shape of the projector 1 according to Embodiment 3, respectively corresponding to the operating condition and the non-operating condition. FIG. 12A is a sectional view showing an internal structure of the projector 1 according to Embodiment 3 in the operating condition. FIGS. 12B and 12C are cross sectional views respectively taken along line XIIB—XIIB and line XIIC—XIIC in FIG. 12A. FIG. 13A is a sectional view showing an internal structure of the projector 1 according to Embodiment 3 in the non-operating condition. FIGS. 13B and 13C are cross sectional views respectively taken along line XIIB–XIIIB and line XIIIC—XIIIC in FIG. 13A.

In Embodiments 1 and 2, the distance between the exhaust ports 45 and the exhaust fan 9 increases as the third part 4 moves to the enlarging position, thereby restricting the wind noise. In Embodiment 3, the distance between the exhaust fan 9 and the lamp 53 increases as the third part 4 moves to the enlarging position.

As shown in FIGS. 10 and 11, in the projector 1 according to Embodiment 3, the exhaust ports 45 are formed at the rear wall of the third part 4. The exhaust fan 9 is disposed in and fixed to the third part 4 so that the exhaust fan 9 is aligned with the exhaust ports 45. Therefore, as the third part 4 moves to the enlarging position, the distance between the exhaust fan 9 and the exhaust ports 45 does not change, but the distance between the exhaust fan 9 and the lamp 53 increases. The components of the projector 1 other than the exhaust ports 45 and the exhaust fan 9 are the same as those of the projector 1 according to Embodiment 2, and the description thereof is omitted.

As described in connection with Embodiments 1 and 2, when the user uses the projector 1, the user connects the power supply cable 5 to the receptacle. Further, the user presses the power switch 6, and then presses the accommodation release button 10 so that the third part 4 moves to the enlarging position. Since the exhaust fan 9 moves together with the third part 4, the distance between the exhaust fan 9 and the lamp 53 increases. Further, together with the movement of the third part 4 to the enlarging position, the exhaust ports 45 are exposed and the inlet ports 2b are opened. Further, as the switch 50 is switched by the movement of the third part 4, the power supply circuit 52 is permitted to supply the power to the lamp 53. In this condition, when the user presses the ON-OFF button 7a, the lamp 53 is turned on and the projection of the image is started. Additionally, the power indicator 7b is turned on, and the exhaust fan 9 starts blowing the air. The air in the projector 1 is exhausted through the exhaust ports 45, while the outside air flows in the projector 1 through the inlet ports 2b.

In order to keep the exhaust fan 9 operating properly, it is necessary to keep the temperature of a fan motor built in the exhaust fan 9 within a suitable temperature range. In Embodiment 3, the distance between the exhaust fan 9 and the lamp 53 increases as the third part 4 moves to the enlarging position. As a result, the temperature of the lamp 53 can be kept in a suitable range, without using a reflector or the like for shielding the exhaust fan 9 from the radiation from the lamp 53.

After the image projection is completed, the user presses the ON-OFF button 7a to turn off the lamp 53, and pushes the third part 4 into the first part 2 and the second part 3. The inlet ports 2b are closed as described in connection with Embodiment 2, preventing the entry of the air into the projector 1 through the inlet ports 2b. In addition, the switch 50 is switched by the movement of the arm 11 provided on the third part 4, and therefore the supply of the power from the power supply circuit 52 to the lamp 53 is prohibited.

As described above, according to Embodiment 3, the temperature of the motor built in the exhaust fan 9 is kept within a suitable temperature range without using the reflector the like. Accordingly, the number of the components of the projector 1 is reduced, and therefore the manufacturing method of the projector 1 is simplified. In addition, the portability of the projector is enhanced as described in connection with the previous Embodiments.

In Embodiment 3, the exhaust ports 45 are provided at the rear wall of the third part 4. However, the exhaust ports 45 can be provided on the top plate, the bottom plate, or both plates of the third part 4. With such an arrangement, the air exhausted through the exhaust ports 45 does not blow toward the persons beside the projector 1. Further, when the third part 4 is in the reducing position, the exhaust ports 45 are concealed in the first part 2 and the second part 3, preventing the entry of the dust or the like into the projector 1 through the exhaust ports 45 in the non-operating condition.

Embodiment 4.

Figure 14:
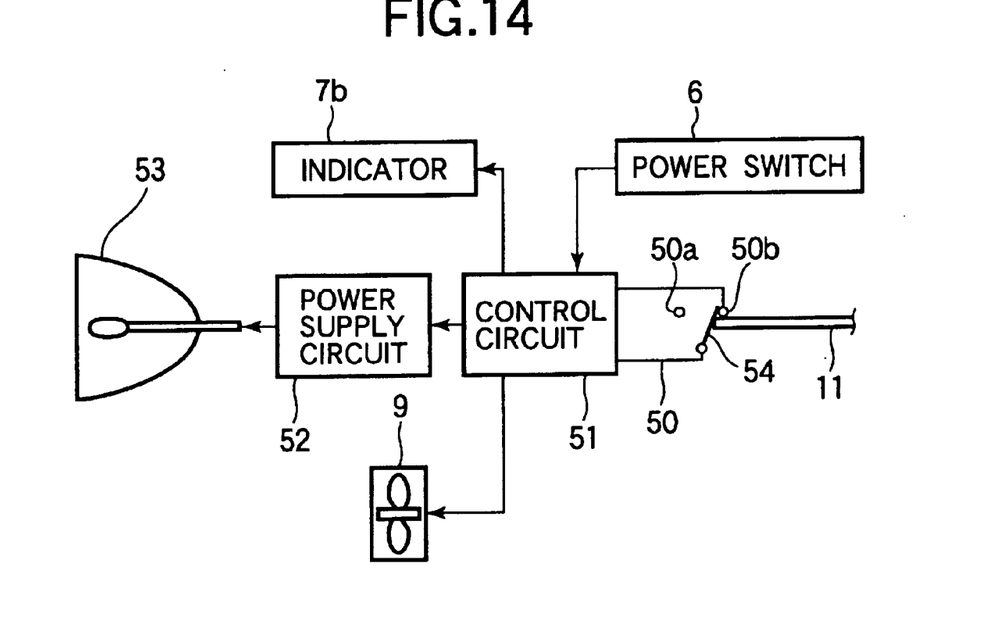
FIG. 14 is a block diagram showing a control system of the projector according to Embodiment 4.

FIG. 14 is a block diagram showing a control system of the projector 1 according to Embodiment 4. The projector 1 according to Embodiments 1 through 3 has the ON-OFF button 7a for turning on and turning off the lamp 53. The projector 1 of Embodiment 4 does not have the ON-OFF button 7a. Instead, the lamp 53 is turned on and off by the movement of the third part 4 between the enlarging position and the reducing position. The construction of the projector 1 other than the control system can be the same as any of Embodiment 1, 2 and 3.

When the user uses the projector 1, the user connects the power supply cable 5 to the receptacle. The user presses the power switch 6, and then presses the accommodation release button 10 so that the third part 4 moves to the enlarging position. When the switch 50 is switched to the contact 50b by the arm 11 as the third part 4 moves to the enlarging position, the control circuit 51 causes the power supply circuit 52 to start supplying the power to the lamp 53. With this, the lamp 53 is turned on and the projection of the image is started. At the same time, the exhaust fan 9 starts blowing the air. The indicator 7b may indicate that the projector 1 is turned on. When the user pushes the third part 4 into the first part 2 and the second part 3, the switch 50 is switched to the contact 50a by the arm 11. Thus, the control circuit 51 causes the power supply circuit 52 to stop supplying the power to the lamp 53, so that the lamp 53 is turned off. At the same time, the exhaust fan 9 stops blowing the air.

According to Embodiment 4, the lamp 53 is turned on and turned off by the movement of the third part 4 between the enlarging position and the reducing position. As a result, the ON-OFF button 7a is eliminated. Therefore, the number of the components of the projector 1 is reduced, and the erroneous operation is prevented.

Embodiment 5.

Figure 15:
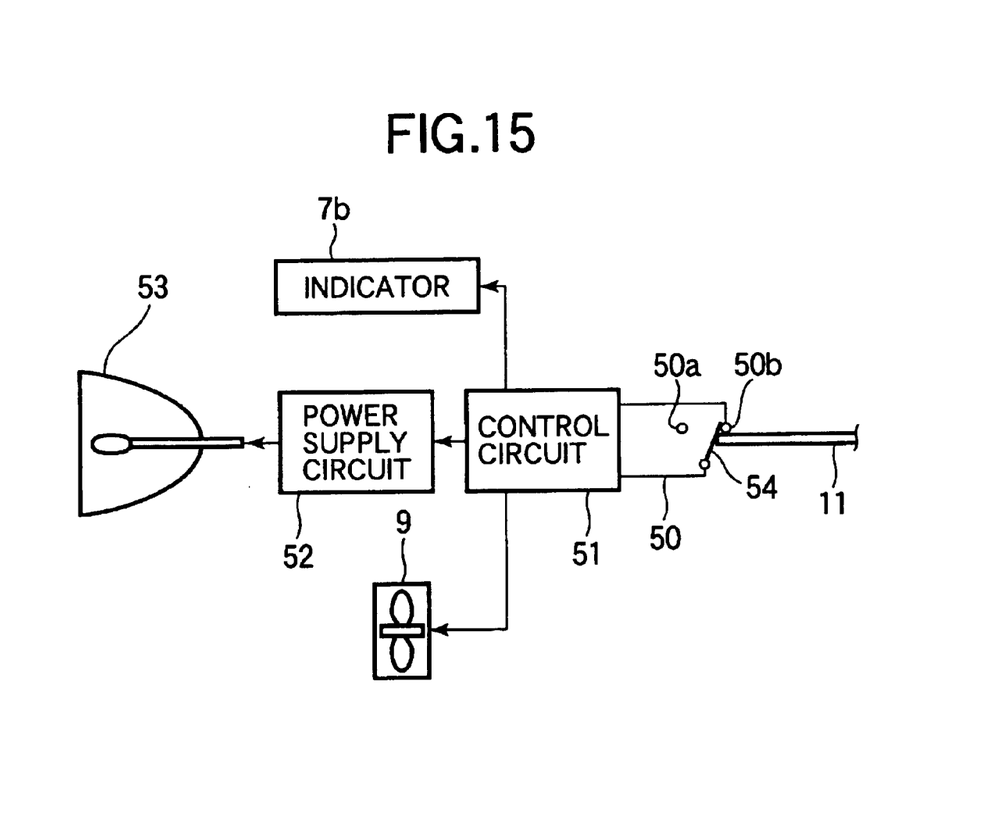
FIG. 15 is a block diagram showing a control system of the projector according to Embodiment 5.

FIG. 15 is a block diagram showing a control system of a projector 1 according to Embodiment 5. The projector 1 according to Embodiment 5 does not have the power switch 6 nor the ON-OFF button 7a. In Embodiment 5, the main power of the projector 1 is turned on and off by the movement of the third part 4 between the enlarging position and the reducing position. In addition, as in Embodiment 4, the lamp 53 is turned on and off by the movement of the third part 4 between the enlarging position and the reducing position. The control circuit 51 is supplied with the power by a battery or the like mounted in the projector 1. The construction of the projector 1 other than the control system can be the same as any of Embodiment 1, 2 and 3.

When the user uses the projector 1, the user connects the power supply cable 5 to the receptacle, and presses the accommodation release button 10 so that the third part 4 moves to the enlarging position. As the third part 4 moves to the enlarging position, the switch 50 is switched to the contact 50b by the arm 11. Then, the control circuit 51 turns on the main power of the projector 1, and causes the power supply circuit 52 to start supplying the power to the lamp 53. Thus, the lamp 53 is turned on and the projection of the image is started. At the same time, the control circuit 51 causes the exhaust fan 9 to start blowing the air. The indicator 7b may indicate that the projector 1 is turned on. When the user pushes the third part 4 into the first part 2 and the second part 3, the switch 50 is switched to the contact 50a since the swing lever 54 is pushed by the arm 11. Thus, the control circuit 51 causes the power supply circuit 52 to stop supplying the power to the lamp 53, and turns off the main power of the projector 1. At the same time, the control circuit 51 causes the exhaust fan 9 to stop blowing the air.

According to Embodiment 5, the main power of the projector 1 is turned on and off by the movement of the third part 4 between the enlarging position and the reducing position. As a result, the power switch 6 and the ON-OFF button 7a are eliminated. Therefore, the number of the components of the projector 1 is reduced, and the erroneous operation is prevented.

In Embodiments described above, the enclosure of the projector 1 includes three parts (the first part 2, the second part 3 and the third part 4). However, the enclosure can be constructed otherwise.

Further, in Embodiments described above, the third part 4 is described as being accommodated in the first part 2 and the second part 3. However, it is possible that the third part 4 is fit on the exterior of the first part 2 and the second part 3.

What is claimed is:

1. A projector comprising:
an image projection unit which projects an image, said image projection unit having a light source;
a first casing in which said image projection unit is mounted;
a second casing combined with said first casing thereby to constitute an enclosure enclosing said image projection unit, said second casing being movable relative to said first casing, between an enlarging position where the volume of said enclosure is enlarged and a reducing position where the volume of said enclosure is reduced;
an exhaust fan mounted to said first casing, said exhaust fan rotating when said light source illuminates; and
an exhaust port formed on said second casing.

2. The projector as set forth in claim 1, further comprising a controller which permits the illumination of said light source and the rotation of said exhaust fan, when said second casing is in said enlarging position, and prohibits the illumination of said light source and the rotation of said exhaust fan, when said second casing is in said reducing position.

3. The projector as set forth in claim 1, wherein said exhaust port is opened when said second casing is in said enlarging position, and said exhaust port is closed when said second casing is in said reducing position.

4. The projector as set forth in claim 1, wherein said exhaust port is formed on at least one of a top plate and a bottom plate of said second casing.

5. The projector as set forth in claim 1, further comprising an inlet port which is opened when said second casing is in said enlarging position and which is closed when said second casing is in said reducing position.

6. The projector as set forth in claim 5, wherein said inlet port is formed on said first casing, and said second casing has an opening which overlaps with said inlet port when said second casing is in said enlarging position.

7. The projector as set forth in claim 2, wherein said controller causes said light source to start illuminating when said second casing moves to said enlarging position, and said controller causes said light source to stop illuminating when said second casing moves to said reducing position.

8. The projector as set forth in claim 2, wherein said controller turns on the main power when said second casing moves to said enlarging position, and said controller turns off said main power when said second casing moves to said reducing position.

9. The projector as set forth in claim 2, wherein said controller comprises:
a power supply circuit which supplies the power to said light source;
a switch operated by the movement of said second casing between said enlarging position and said reducing position; and
a control circuit which permits or prohibits the supply of the power from said power circuit to said light source, according to the operation of said switch.

10. The projector as set forth in claim 1, further comprising:
a lock mechanism which locks said second casing at said reducing position; and
a lock release mechanism operated by a user to release said second casing from said lock mechanism.

11. The projector as set forth in claim 10, wherein said lock mechanism comprises:
a first lock member provided on said first casing; and
a second lock member provided on said second casing, said second lock member engaging said first lock member when said second casing is in said reducing position.

12. The projector as set forth in claim 1, further comprising a spring member which pushes said second casing toward said enlarging position.

13. The projector as set forth in claim 1, further comprising:
a guide groove provided on one of said first casing and said second casings; and
a guide pin provided on the other of said first casing and said second casings, said guide pin slidably engaging said guide groove.

14. A projector comprising:
an image projection unit which projects an image, said image projection unit having a light source;

a first casing in which said image projection unit is mounted;

a second casing combined with said first casing thereby to constitute an enclosure enclosing said image projection unit, said second casing being movable relative to said first casing, between an enlarging position where the volume of said enclosure is enlarged and a reducing position where the volume of said enclosure is reduced;

an exhaust fan mounted to said second casing, the distance between said exhaust fan and said light source being longer when said second casing is in said enlarging position than when said second casing is in said reducing position; and an exhaust port formed on said second casing.

15. The projector as set forth in claim 14, further comprising a controller which permits the illumination of said light source and the rotation of said exhaust fan, when said second casing is in said enlarging position, and prohibits the illumination of said light source and the rotation of said exhaust fan, when said second casing is in said reducing position.

16. The projector as set forth in claim 14, wherein said exhaust port is opened when said second casing is in said enlarging position, and said exhaust port is closed when said second casing is in said reducing position.

17. The projector as set forth in claim 14, further comprising an inlet port which is opened when said second casing is in said enlarging position and which is closed when said second casing is in said reducing position.

18. The projector as set forth in claim 15, wherein said controller causes said light source to start illuminating when said second casing moves to said enlarging position, and said controller causes said light source to stop illuminating when said second casing moves to said reducing position.

19. The projector as set forth in claim 15, wherein said controller turns on the main power when said second casing moves to said enlarging position, and turns off the main power when said second casing moves to said reducing position.

* * * * *